United States Patent [19]

Fath

[11] Patent Number: 5,479,478
[45] Date of Patent: Dec. 26, 1995

[54] METHOD AND SYSTEM FOR PULL COMMUNICATION

[75] Inventor: August F. Fath, Seattle, Wash.

[73] Assignee: Boeing Information Services, Inc., Vienna, Va.

[21] Appl. No.: 361,888

[22] Filed: Dec. 22, 1994

Related U.S. Application Data

[63] Continuation of Ser. No. 11,306, Jan. 29, 1993, abandoned.

[51] Int. Cl.[6] ................................................. H04Q 7/20
[52] U.S. Cl. ............................................. 379/58; 379/57
[58] Field of Search ............................... 379/58, 59, 60, 379/61, 62, 63, 57, 91, 144; 455/33.1, 33.2, 53.1, 54.1, 54.2

[56] References Cited

U.S. PATENT DOCUMENTS

| H610 | 3/1989 | Focarile et al. | 379/57 |
|---|---|---|---|
| Re. 33,417 | 10/1990 | Bhagat et al. | 379/57 |
| 4,575,582 | 3/1986 | Makino | 179/2 |
| 4,730,310 | 3/1988 | Acampora et al. | 370/95 |
| 4,747,122 | 5/1988 | Bhagat et al. | 379/57 |

(List continued on next page.)

FOREIGN PATENT DOCUMENTS

| 2061090 | 2/1992 | Canada | 667/734 |
|---|---|---|---|
| 0478213 | 4/1992 | European Pat. Off. | H04Q 7/04 |
| 0514360A2 | 4/1992 | European Pat. Off. | H04Q 7/04 |
| 0503813 | 9/1992 | European Pat. Off. | H04Q 7/04 |
| 4118993 | 12/1992 | Germany | H04Q 7/00 |
| 4-286223 | 10/1992 | Japan | H04B 7/26 |
| 2227143 | 7/1990 | United Kingdom | H04Q 7/04 |
| WO91/03900 | 3/1991 | WIPO | H04M 3/50 |
| WO91/09473 | 6/1991 | WIPO | H04B 7/185 |
| WO92/09178 | 5/1992 | WIPO | H04Q 7/00 |

OTHER PUBLICATIONS

"Seattle Communicates Dick Tracy Style," *Electronic Services Update*, Apr. 1991, consisting of 4 pages.

"McCaw Cellular Communications purchases rights to AccessPlus," Apr. 17, 1991, consisting of 2 pages.

"Untitled Article," *Mobile Phone News*, May 9, 1991, No. 9, vol. 9, consisting of 1 page.

"Solutions Offered to Let Mobile Phone Users Receive Calls," *Advanced Wireless Communications*, Jun. 12, 1991, No. 12, vol. 2, consisting of 2 pages.

Booker, Ellis, "Bell Atlantic number links mobile

(List continued on next page.)

*Primary Examiner*—Curtis Kuntz
*Assistant Examiner*—William G. Trost
*Attorney, Agent, or Firm*—Seed and Berry

[57] ABSTRACT

A pull communication system enables a call from a calling party to a called party to be completed directly, irrespective of the location of the called party within a cellular telephone system. In a preferred embodiment, a calling signal is directed to a pull central office that creates switching information used to connect the called party to the calling party. The pull central office includes a switch for receiving the calling signal at a first port. The pull central office also includes a switch controller in communication with the switch, the switch connecting the switch controller to the calling signal. The switch controller obtains a called party identifier from the calling party. The switch controller creates a call request signal that includes the switching information and the called party identifier. The switch controller causes a switch transmitter to transmit the call request signal to the called party, and when the called party responds with a call acceptance signal at a second port, connects the second port to the first port, thereby completing the call. The pull communication system includes a receiving cellular telephone that includes a receiver for receiving the call request signal from the pull central office. The receiving cellular telephone also includes a pull controller that receives and decodes the call request signal.

40 Claims, 8 Drawing Sheets

U.S. PATENT DOCUMENTS

| | | | |
|---|---|---|---|
| 4,748,655 | 5/1988 | Thrower et al. | 379/57 |
| 4,776,003 | 10/1988 | Harris | 379/59 |
| 4,829,554 | 5/1989 | Barnes et al. | 379/58 |
| 4,833,701 | 5/1989 | Comroe et al. | 379/60 |
| 4,893,307 | 1/1990 | McKay et al. | 370/94.1 |
| 4,975,693 | 12/1990 | Davis et al. | 340/825.47 |
| 5,021,949 | 6/1991 | Morten et al. | 364/200 |
| 5,090,051 | 2/1992 | Muppidi et al. | 379/63 |
| 5,093,659 | 3/1992 | Yamada | 340/825.53 |
| 5,095,480 | 3/1992 | Fenner | 370/94.1 |
| 5,113,495 | 5/1992 | Uehara | 395/200 |
| 5,117,449 | 5/1992 | Metroka et al. | 379/58 |
| 5,175,758 | 12/1992 | Levanto et al. | 379/57 |

OTHER PUBLICATIONS exchanges," *Computerworld,* Mar. 23, 1992, p. 12, consisting of 1 page.

"Key Recent Efforts by Bams, Others Bring One–Number Era Closer," *Advanced Wireless Communications,* Apr. 1, 1992, No. 7, vol. 3, consisting of 4 pages.

"Operators Subscribe to One–Person, One–Number Idea," *PCN News,* Apr. 2, 1992, No. 7, vol. 3, consisting of 3 pages.

"Bell Atlantic to Offer One–Number Service to Cellular Customers," *Telephone Week,* Mar. 23, 1992, Section No. 12, vol. 9, consisting of 2 pages.

METHOD AND SYSTEM FOR PULL COMMUNICATION

CROSS-REFERENCE TO RELATED APPLICATION

This application is a continuation of U.S. patent application Ser. No. 08/011,306, filed Jan. 29, 1993, now abandoned.

TECHNICAL FIELD

The present invention relates to telephone communications and more particularly to a pull communications method and system for accessing cellular telephones and the like.

BACKGROUND OF THE INVENTION

Both paging systems and mobile telephone systems are widely used forms of communication. These systems allow individuals to keep in contact while away from a fixed telephone.

Existing paging systems are one-way radio communication systems. Typically, a paging system includes a centrally located control unit and a plurality of mobile pagers carried by individuals within a region. When a paging party wishes to contact an individual carrying a pager, the paging party dials the telephone number of the pager. The call is routed to the central control unit, which may be an automatic device or a human-operated device (for example, a telephone answering service). The paging party can either leave a voice message for the person being paged or key in the paging party's telephone number or other message. The central control unit will then transmit a radio signal addressed to the appropriate pager. Upon receipt of this radio signal, the receiving pager will either prompt the individual to call the central control unit to receive a message or display the calling telephone number or other message. Current paging systems are national in scope and are expected to become international in the near future.

Many prior art mobile telephone systems are cellular in nature. That is, the service area of the company providing the telephone system is divided into cells or regions. A central switching office connected to each cell allows mobile telephones within the cell to be contacted. Typically, an individual places a telephone call to an individual cellular phone, which is routed to the cellular central office. The central office signals the called party either directly or through a number of other cells and completes the call if the called party answers the called mobile telephone.

Many existing cellular telephone systems suffer from the problem that a cellular telephone cannot receive telephone calls if it is outside its local cellular service area. This is so because none of the cell transmitters within the local network has enough range to establish communication with the cellular telephone. Another problem is that if the cellular telephone is turned off or the user is away from the cellular telephone when a call is made to that device, the call will be missed. Another problem is that the cellular telephone user typically pays for incoming as well as outgoing calls. If an unwanted call is made to the cellular telephone, the cellular telephone user must pay for it.

Several solutions have been proposed to remedy the problem of contacting a cellular telephone that is outside of its local cellular service area. One system maintains a database that stores the location of each cellular telephone. When a cellular telephone makes a call, the database stores the calling telephone number and cell location of the cellular telephone in order to locate that telephone when it is called in the future. Alternatively, each cellular telephone can be programmed to automatically send a signal to the database to update the database instead of waiting for each telephone to make an actual telephone call. Database systems of this type are undesirable because there is a relatively high overhead in creating and maintaining such a database. Further, the maintenance of such databases raise privacy and security issues for individual cellular telephone users.

An alternative to the database system is described in U.S. Pat. No. 5,117,449 to Metroka et al. The system described therein combines a paging receiver with a cellular telephone. To contact a pager/cellular telephone outside of the local cellular service area, a calling telephone places a first call to a paging control unit, which pages the pager/cellular telephone and transmits the telephone number of the calling telephone to the pager portion of the pager/cellular telephone. If desired, the cellular telephone user may then place a second call back to the calling telephone using the telephone number. While this system relieves some of the problems in locating distant cellular telephone users, it is undesirable because it requires a separate telephone call to be placed by the pager/cellular telephone user to connect with the calling party.

SUMMARY OF THE INVENTION

The present invention is directed to a pull communication system and components thereof for completing a call directly from a calling device to a receiving cellular telephone or comparable device. In a preferred embodiment, a call is directed to a pull central office that creates switching information used to connect the receiving cellular telephone to the call placed by the calling telephone, thereby completing the original call.

In a preferred embodiment illustrated herein, the pull central office includes a switch and switch controller for receiving a calling signal originating from the calling telephone at a first switch port. The switch controller obtains a receiving telephone identifier from the calling party and creates a call request signal that includes the receiving telephone identifier, identifier of a second switch port for receiving a call acceptance signal from the receiving telephone, and a message identifier for connecting the second switch port with the first switch port. The switch controller causes a switch transmitter to transmit the call request signal to the receiving telephone, and when the receiving telephone responds with a call acceptance signal at the second switch port, connects the second switch port to the first switch port, thereby completing the call.

A receiving cellular telephone, in accordance with the preferred embodiment described herein, includes a receiver for receiving the call request signal from the pull central office and a pull controller that receives and decodes the call request signal. The pull controller causes a transmitter to transmit a call acceptance signal to the second switch port of the pull central office. Once the call acceptance signal is connected, the pull controller sends the message identifier to the pull central office to enable the pull central office to connect the receiving telephone to the calling telephone. In an alternate embodiment the pull controller sends the call acceptance signal only if the user indicates a desire to accept the call.

DETAILED DESCRIPTION OF THE INVENTION

Figure 1:
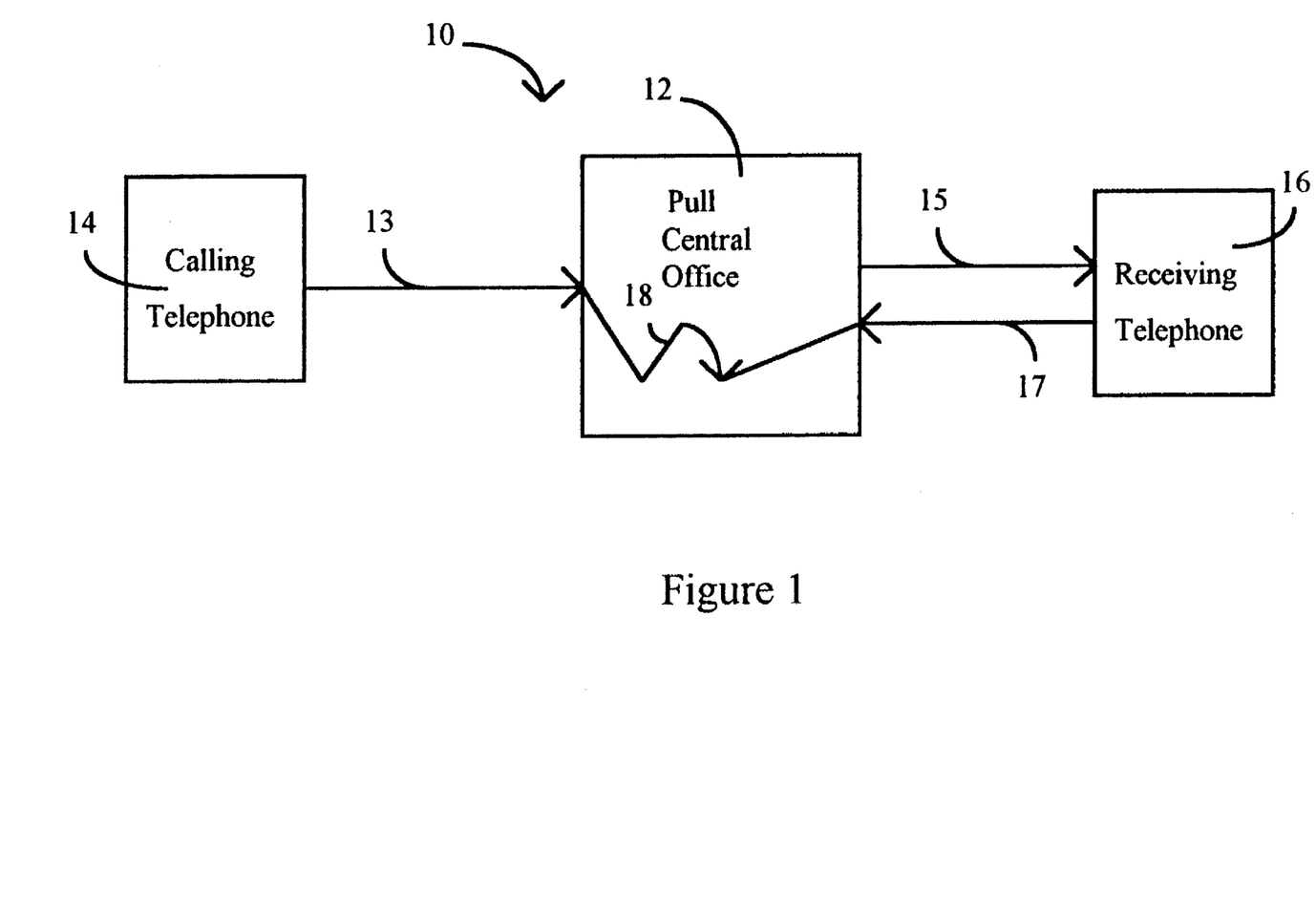
FIG. 1 is a block diagram of a preferred embodiment of a pull communications system according to the present invention.

An overview of the operation of pull communication system 10 according to a preferred embodiment of the present invention is illustrated in FIG. 1. The pull communication system includes a pull central office 12 that receives a calling signal 13 originating from a calling telephone 14 that can be either fixed or cellular. The pull central office 12 broadcasts a call request signal 15 to a cellular receiving telephone 16. The receiving telephone 16 transmits a call acceptance signal 17 to the pull central office 12. A switch 18 in the pull central office 12 connects the call acceptance signal 17 to the calling signal 13 to establish communication between the calling telephone 14 and the receiving telephone 16, thereby completing the original call placed by the calling party.

Figure 2:
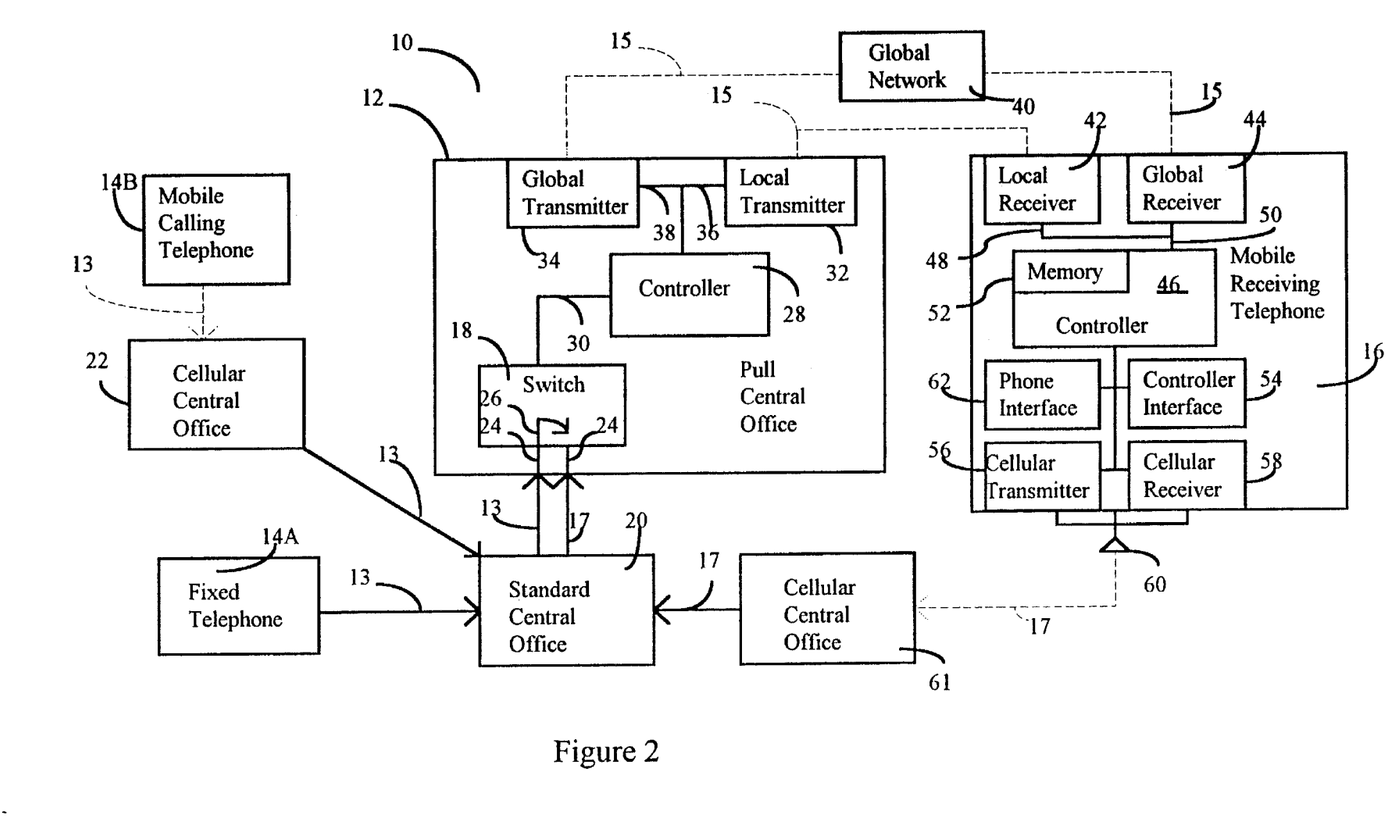
FIG. 2 is a detailed block diagram of the pull communications system of FIG. 1.

As shown in the more detailed illustration of FIG. 2, the calling telephone 14 can be a fixed calling telephone 14A or a cellular calling telephone 14B. The receiving telephone 16 includes all functional elements of conventional cellular telephones and conventional radio pagers. Since the cellular receiving telephone 16 includes a conventional cellular telephone, it can be used as the calling telephone 14 to access another cellular receiver telephone 16. Although the preferred embodiments discussed herein illustrate communications between telephones, it will be obvious to those of skill in the art that communications between other devices, such as portable computers equipped modems, portable fax machines, etc. could be handled in the same manner. Thus, as used herein, "telephone" includes any device for two-way voice or data communication.

As discussed above, the pull central office 12 receives a calling signal 13 from the calling telephone 14. When the calling telephone 14 is the fixed calling telephone 14A, it sends the calling signal to a standard central office 20 operated by a local telephone company, such as U.S. West. When the calling telephone is the cellular calling telephone 14B, it sends the calling signal to a conventional cellular central office 22, which passes the calling signal to the standard central office 20. The standard central office passes the calling signal to the pull central office 12, regardless of whether the calling signal originated in the fixed calling telephone or the cellular calling telephone. It should be noted that the pull central office could include a cellular signal receiver so that the calling signal could pass directly from the cellular central office to the pull central office. At this time, such a system is needlessly expensive for most applications because cellular communications are much more expensive than standard fixed-line communications.

The switch 18 of the pull central office 12 includes a plurality of switch ports 24, one of which receives the calling signal from the standard central office 20. The switch 18 is a conventional switch such as a Private Branch Exchange (PBX) or central office switch such as an AT&T 5ESS or Northern Telecom DMS1000. Each of the switch ports can be internally connected to other switch ports by numerous mini-switches 26 contained within the switch to provide selective communication between switch ports.

The pull central office 12 includes a controller 28 in communication with the switch 18 via a command line 30. The controller can be any modern workstation such as an Intel 486-based personal computer that is programmed to provide, among other things, switching commands to the switch to selectively connect any two switch ports 24. The controller preferably includes an analog to digital (A/D) converter (not shown) to convert analog calling signals from the fixed calling telephone 14A into digital form for use by the controller if the fixed calling telephone does not have digital capabilities.

The pull central office 12 includes a local transmitter 32 and a global transmitter 34 that are coupled to the controller 28 via respective signal lines 36, 38. The local transmitter sends call request signals to the cellular receiving telephone 16 via one or more land-based relay towers (not shown). The global transmitter sends call request signals to a global network 40 that includes one or more satellites that convey signals across great distances, such as across the United States. The local and global transmitters can be those used with current nationwide paging systems.

The cellular receiving telephone 16 includes a local receiver 42 and a global receiver 44. The local receiver 42 receives the call request signals from the local transmitter 32 of the pull central office 12. The global receiver receives the call request signals from the global network 40. The local and global receivers are connected to a computer controller 46 via respective signal lines 48, 50. The controller includes a memory 52, a portion of which is non-volatile, that stores telephone identification information, such as a telephone identification number, that allows the receiving telephone 16 to verify call request signals received by the receiving telephone. The telephone identification information can additionally include an identification of a class of users to which the user of the receiving telephone belongs. A controller interface 54 allows the controller to output to a user information or queries, such as an identification of the calling party or a query whether to accept a call, and to receive responses and other control information from the user.

As is conventional, the cellular receiving telephone 16 includes a cellular transmitter 56 and cellular receiver 58 to provide normal cellular connections via an antenna 60. The transmitter 56 can establish new telephone connections as is conventional or it can transmit the call acceptance signal 17 to complete a call made from the calling telephone 14. The cellular receiving telephone 16 also includes a telephone interface 62 that provides normal telephone conversation functions. The computer controller 46 provides a functional connection between the telephone interface and the transmitters and receivers to allow all conventional telephone functions.

The pull communication system 10 uses a conventional cellular central office 61 that receives the call acceptance signal 17 from the receiving telephone 16. The cellular central office 61 and the cellular central office 22 are the same entity if the receiving telephone 16 is located in the same cellular area as the cellular calling telephone 14B. Otherwise the cellular central office 61 is a separate entity located outside of the cellular area of the cellular central office 22.

Figure 3:
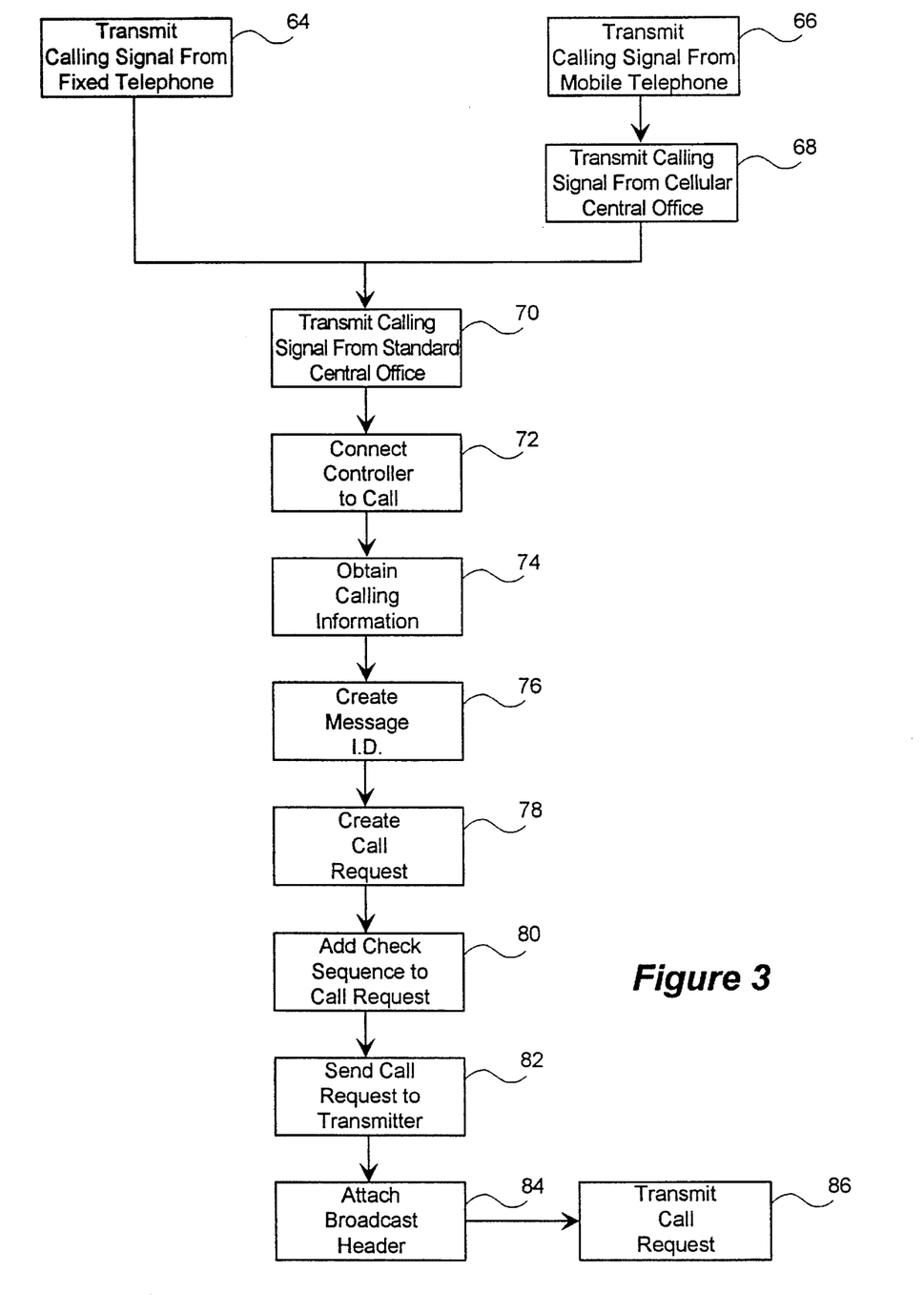
FIG. 3 is a flow diagram of the processing performed by the preferred embodiment of a pull central office of the pull communication system shown in FIG. 1.
Figure 4:
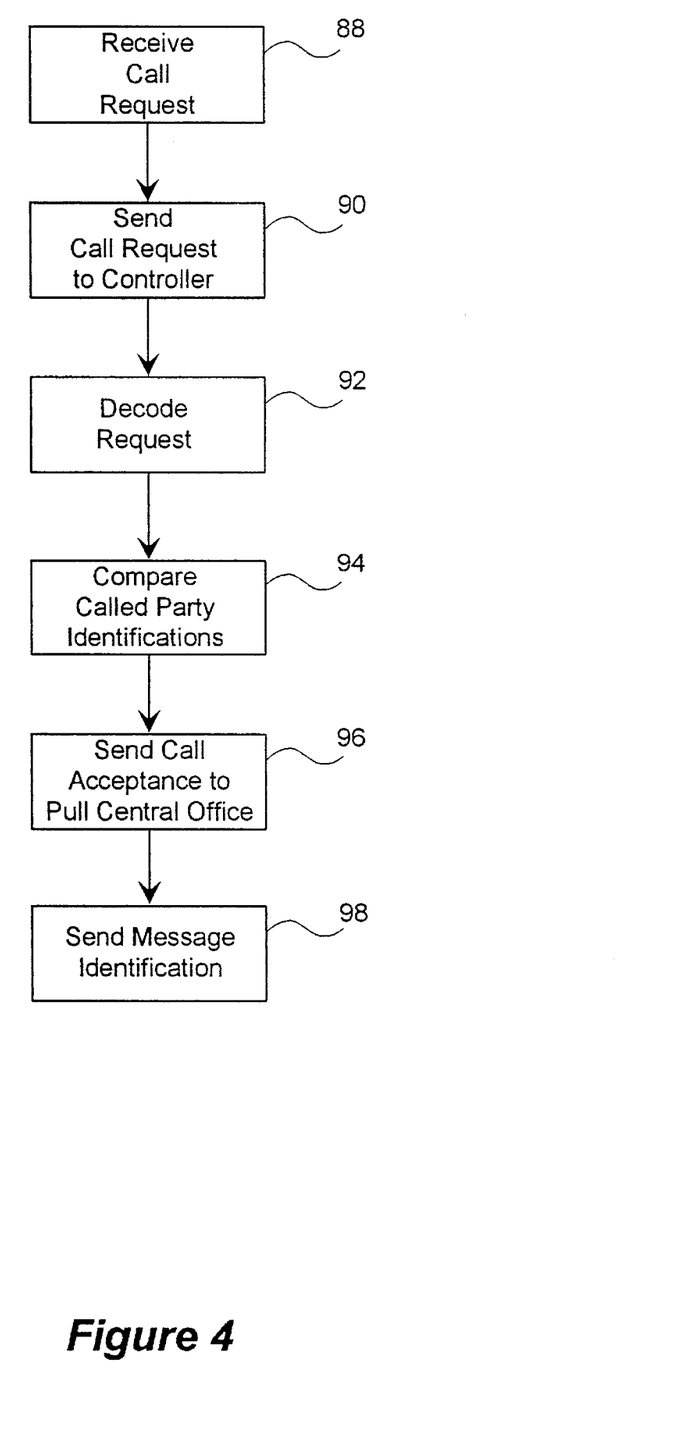
FIG. 4 is a flow diagram of the processing performed by a preferred embodiment of a receiving cellular telephone of the pull communication system shown in FIG. 1.
Figure 5:
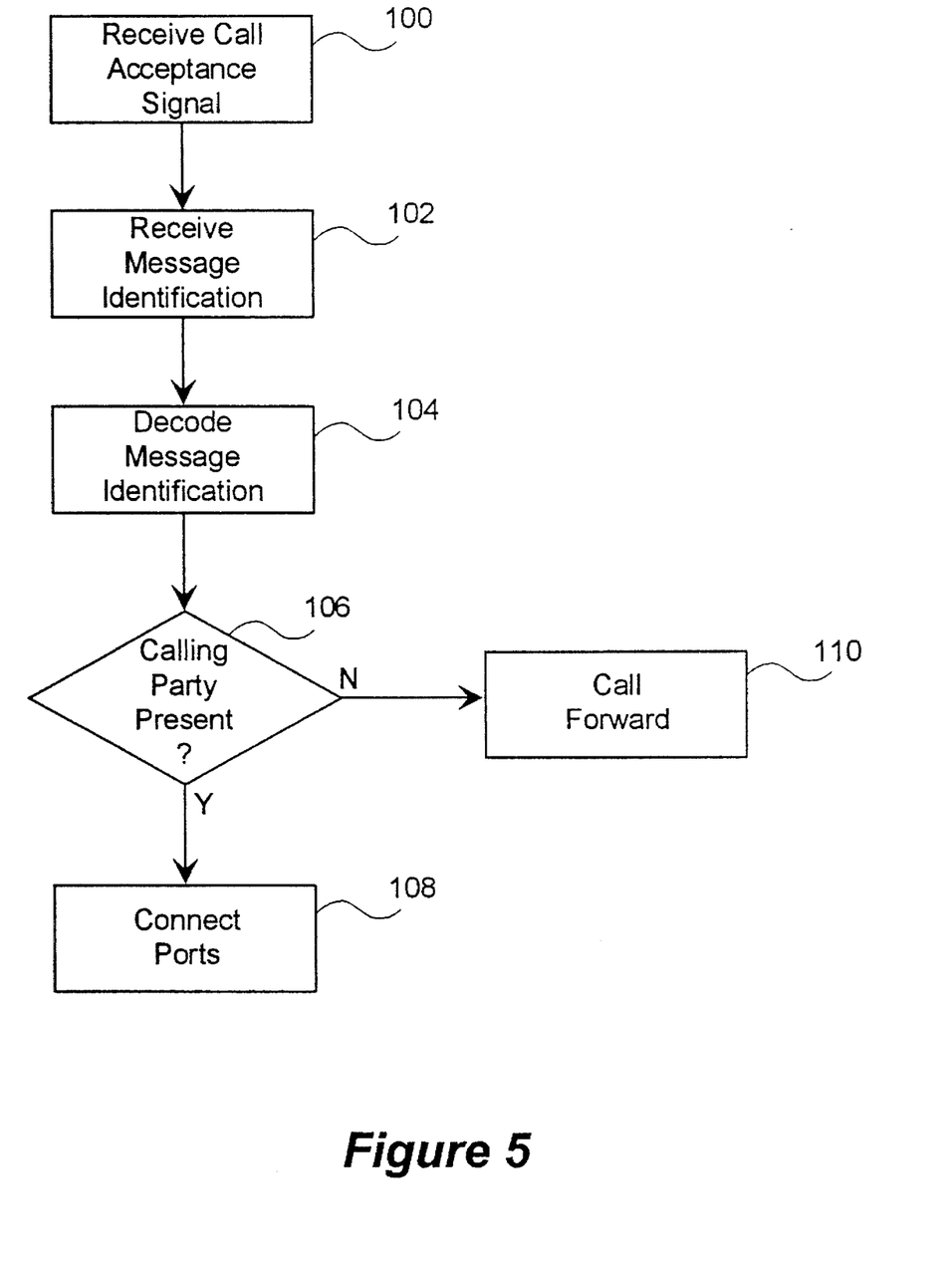
FIG. 5 is a flow diagram of further processing performed by the preferred embodiment of the pull central office of the pull communication system shown in FIG. 1.

The operation of the pull communication system 10 can best be understood in connection with the flow diagrams shown in FIGS. 3–5. Operation of the pull communication system 10 begins when a calling signal 13 is transmitted from the fixed telephone 14A in step 64 or the cellular telephone 14B in step 66. If the calling signal is from the fixed telephone 14A, then the calling signal is transmitted directly to the standard central office 20. If the calling signal is from the cellular telephone 14B, then the calling signal is transmitted to the cellular central office 22, and then transmitted from the cellular central office to the standard central office in step 68. In step 70, the standard central office transmits the calling signal to the switch 18 of the pull central office 12.

In step 72 the pull central office switch 18 connects the controller 28 to the incoming calling signal 13 via the command line 30. In step 74 the controller 28 obtains calling information needed to complete the call. The calling information includes an identification, such as telephone number, of an individual party or a class of parties being called. Further, the calling information preferably includes an identification of the call priority. The call priority allows a caller to inform the controller whether the called party should be contacted only locally or on a "global" basis, that is, within the reach of the global network 40.

There are at least two operational modes that can be used to obtain the calling information necessary to complete a call from the calling telephone 14 to the receiving telephone 16. In a first mode, the calling telephone transmits a standard telephone number that uniquely identifies the receiving telephone. For example, assume that the receiving telephone is issued a telephone number of "555-1234." Stored in the standard central office 20 is a directory that identifies the first three digits "555" of the telephone number with the pull central office 12. Stored in the pull central office controller 28 is a directory that decodes the number "555-1234" into a digital called party identification code. As a result, the standard central office and the pull central office route the calling signal from the calling telephone to the receiving telephone simply by using the telephone number issued to the receiving party.

In a second mode, the calling telephone 14 transmits a standard telephone number that identifies the pull central office 12 rather than the receiving telephone 16. In the second mode, the standard central office 20 stores a directory that identifies a telephone number, such as "555-1000," with the pull central office 12. The standard central office simply acts as if the pull central office were a fixed telephone 14A. When connected to the calling signal 13, the pull central office controller 28 queries the calling telephone for further information identifying the receiving telephone.

In a preferred embodiment implementing the second mode, each receiving telephone 16 is associated with a 64-bit identification code (18 digits). If the calling party knows the identification code for the desired receiving telephone, or the identification code is stored in the calling telephone 14, the calling telephone transmits that identification code to the pull central office controller. Since it is painstaking for a user of the calling telephone to input 18 digits each time the receiving telephone is called, the calling telephone preferably is equipped with programmable speed dialing capabilities so that the 18 digit code is sent automatically.

Alternatively, the pull central office controller 28 stores a directory of 64-bit identification codes associated with information regarding the user of the receiving telephone 16, such as the user's name. The controller 28 prompts the user of the calling telephone 14 to input the receiving telephone user's name, such as by speaking or keying in the name. If more than one user has the same name the controller asks the calling telephone user to input additional information to uniquely identify the receiving telephone user. The technology for uniquely identifying a called party via one or more queries from a computer is presently implemented in voice mail systems. The controller converts the identification information into the 64-bit identification code and incorporates the identification code into the call request signal.

Irrespective of the operating mode, the process for connecting the receiving telephone 16 to the calling telephone 14 is automatically activated whenever a call request signal 15 is received in the receiving telephone. Alternatively, a user of the receiving telephone is given a choice of whether to accept the call request signal. In order to make such a decision, the user needs to know the identity of the calling party. In some systems, the calling party identification is obtained automatically using Automatic Number Identification (ANI, a system commonly used to identify a calling party in the event the calling party enters an emergency number such as 911. Alternatively, the pull central office controller 28 can be programmed to obtain the identification by prompting the calling party to input the information after the controller has been connected to the calling party.

In step 76 the pull central office controller 28 creates a message identification for the incoming call that will allow the controller to connect the call acceptance signal 17 from the receiving telephone 16 to the pull central office switch port 24 containing the incoming calling signal, to complete the call. The message identification can also identify how to reach the calling party in the event that the incoming call signal is no longer connected to its assigned switch port 24.

In step 78 the pull central office controller 28 creates the call request signal 15. The call request signal includes: (1) the called party identification; (2) the calling party identification (optional); (3) an identification of the switch port or ports 24 for receiving the call acceptance signal 17; and (4) the message identification. In step 80 the controller 28 adds a message integrity check sequence based on the information in the call request signal that allows the called party controller 82 to determine whether the call request was received without errors. Message integrity check sequences are well known in the signal processing art and can be a simple checksum or a cyclic redundancy check (CRC).

In step 82 the pull central office controller 28 sends the call request signal 15 to either the local transmitter 32 or the global transmitter 34, or both. The transmitter is preferably selected based on the call priority received from the calling telephone 14. In step 84 the transmitter attaches a broadcast header to the call request signal. The broadcast header identifies the beginning or end of each call request signal so that several call request signals can be broadcast in series without confusing one call request signal with the next call request signal. In step 86 the call request is broadcast locally, globally, or both.

In order to broadcast as many call request signals as possible within a limited time period, it is desirable to limit the size of each call request. In a preferred embodiment, each call request signal is 256 bits in length or less. A 256-bit call request signal allows, for example, 64 bits each for the called party identification and the calling party identification, 48 bits the the switch port identification, 32 bits for the message identification, 16 bits for the message integrity check sequence, 17 bits for the broadcast header and 15 bits for header protection bits. The header protection bits are added to each 16-bit segment of the call request signal to ensure that the header is not accidentally repeated in the call request signal The operation of the receiving telephone 16 is shown in FIG. 4. In step 88 one of the telephone receivers 42, 44 receives the call request signal 15, depending on whether the call request signal was broadcast locally or globally. In step 90 the receiving telephone receiver transmits the call request signal to the telephone controller 46. In step 92 the telephone controller decodes the call request signal and compares the called party identification in the call request signal to the called party identification(s) stored in the controller memory 52 in step 94. If the identifications match, then the controller determines that the receiving telephone 16 is the intended recipient of the call request signal.

After determining that the cellular receiving telephone is the intended recipient, the telephone controller 46 initiates a call acceptance procedure. In step 96 the telephone controller causes the cellular transmitter 76 to transmit a call acceptance signal 17 to one of the switch ports 24 in the pull central office 12 that were designated in the call request signal 15 as potential receivers of the call acceptance signal. The call acceptance signal is transmitted to the pull central office via the cellular central office 61 and the standard central office 20. Once the call acceptance signal is connected to one of the designated switch ports, the telephone controller sends the message identification to the pull central office via the cellular transmitter, cellular central office and standard central office (step 98).

As mentioned above, in an alternative embodiment, the called party is given a choice of whether to accept the call from the calling party. In such an embodiment, the call request signal includes a calling party identification. The receiving telephone controller 52 causes the controller interface 54 to output the calling party identification and to query the user of the receiving telephone 16 as to whether to accept the call. The user of the receiving telephone can accept the call or accept a message from the calling party. If neither the call nor a message are accepted, then the call is not answered and the receiving telephone awaits a new call. The decisions can be made automatically by appropriate programming of the receiving telephone controller 52. For instance, the telephone controller could easily be programmed to reject the call or accept a message if the user does not make a decision within a predetermined time.

FIG. 5 shows the operation of the pull central office 12 upon receiving the call acceptance signal 17 from the standard central office 20. In step 100 the pull central office switch 18 receives the call acceptance signal at one of the ports 24 identified by the call acceptance signal. In step 102 the pull central office controller receives the message identification from the cellular receiving telephone via the switch 18. In step 104 the controller 28 decodes the call acceptance signal to determine which calling party the call acceptance signal is responding to. In step 106 the controller determines whether the calling party still is connected to the switch 18. If the calling party is still connected, the controller causes the switch to connect the port that received the call acceptance signal to the port that received the call from the calling party, thereby completing the call (step 108). If the calling party is no longer connected, then in step 110 the controller preferably either forwards the call to a message system (not shown) or calls the original calling party in an attempt to establish a link between the port that received the call acceptance signal and a port 24 selected by the controller for the original calling party.

Figure 6:
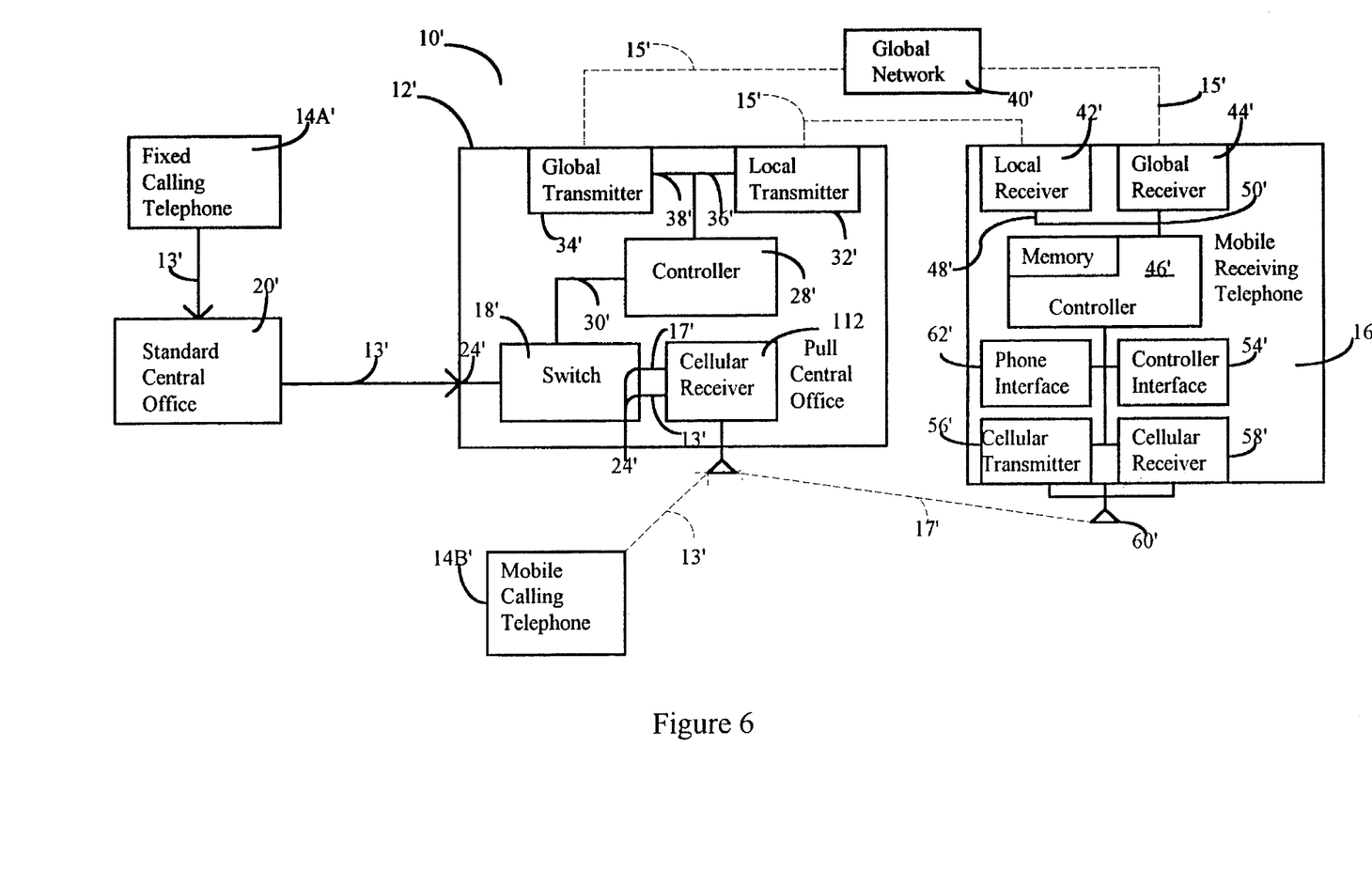
FIG. 6 is a detailed block diagram of an alternate embodiment of the pull communications system of FIG. 1.

Shown in FIG. 6 is an alternate embodiment of a pull communication system 10' according to the present invention. The alternate pull communication system 10' operates identically to the pull communication system 10 shown in FIG. 2, except that the cellular central office and the pull central office are combined into a single entity. All elements shown in FIG. 6 that are identical to corresponding elements shown in FIG. 2 are labeled with the same number together with a prime symbol ('). Since those elements labeled with a prime symbol are identical in structure and function to corresponding elements shown in FIG. 2 and discussed above, many of those elements are not discussed again below.

A pull central office 12' of the pull communication system 10' shown in FIG. 6 is identical to the pull central office 12 shown in FIG. 2 except that the pull central office 12' includes a cellular receiver 112 connected to the switch 18'. The cellular receiver 112 allows the pull communication system 10' to complete a call from a calling telephone 14A', 14B' to a receiving telephone 16' without using a separate cellular central office. Alternatively, a separate cellular central office (not shown) is used when the cellular calling telephone 14B' and the receiving telephone 16' are located in separate cellular areas.

When a calling signal 13' originates from the fixed calling telephone 14A', the process of completing the call continues as discussed above with respect to FIG. 2 until the receiving telephone 16' attempts to respond to a call request signal 15' with a call acceptance signal 17'. Instead of transmitting the call acceptance signal to a cellular central office 61, the receiving telephone 16' sends the call acceptance signal directly to the cellular receiver 112 in the pull central office 12'. The cellular receiver passes the call acceptance signal to a switch port 24' of the pull central office switch 18'. The pull central office controller 28' causes the switch port with the call acceptance signal to be connected to a switch port that received the calling signal 13' from the standard central office 20', thereby completing the call from the fixed calling telephone 14A' to the receiving telephone 16'.

When the calling signal 13' originates from the cellular calling telephone 14B', the process of completing the call is similar to that used for completing the call from the fixed calling telephone 14A'. The cellular calling telephone transmits the calling signal to the cellular receiver 112. The cellular receiver passes the calling signal to a switch port 24' of the pull central office switch 18'. The process of completing the call continues as discussed above with respect to the system of FIG. 2 until the receiving telephone 16' attempts to respond to a call request signal 15' with a call acceptance signal 17'. The receiving telephone 16' sends the call acceptance signal directly to the cellular receiver 112 in the pull central office 12'. The cellular receiver passes the call acceptance signal to a switch port 24' of the pull central office switch 18'. The pull central office controller 28' causes the switch port with the call acceptance signal to be connected to the switch port that received the calling signal 13' from the cellular calling telephone 14B', thereby completing the call from the fixed calling telephone 14A' to the receiving telephone 16'.

Figure 7:
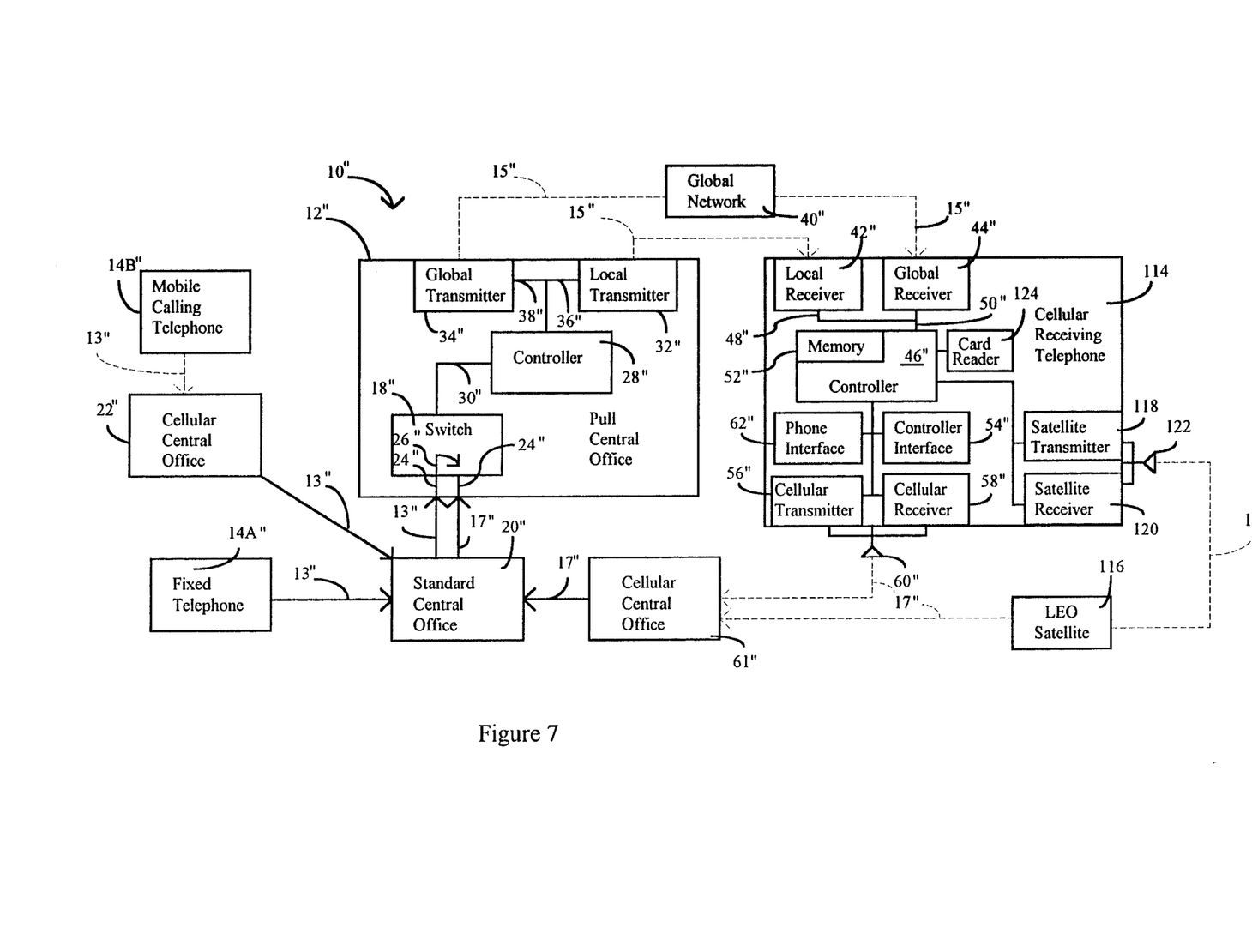
FIG. 7 is a detailed block diagram of an alternate embodiment of the pull communications system of FIG. 1.

Shown in FIG. 7 is a second alternate embodiment of a pull communication system 10" according to the present invention. The alternate pull communication system 10" operates identically to the pull communication system 10 shown in FIG. 2, except that a cellular receiving telephone 114 can choose whether to send its call acceptance signal directly to a cellular central office 61" or via a low-earth orbiting (LEO) satellite 116. Further, the second alternate system 10" allows the receiving telephone 114 to receive calls intended for various users depending on which user is currently in possession of the receiving telephone. All elements shown in FIG. 7 that are identical to corresponding elements shown in FIG. 2 are labeled with the same number together with a double-prime symbol ("). Since those elements labeled with a double-prime symbol are identical in structure and function to corresponding elements shown in FIG. 2 and discussed above, many of those elements are not discussed again below.

Conventional satellites used in global communications, such as the satellites in the global network 40" are positioned 22,240 miles above the Earth so that the satellites revolve about the Earth at the same rate as the Earth rotates. That height results in each satellite always being positioned above the same point on the Earth. In contrast, LEO satellites, such as the LEO satellite 116 shown in FIG. 7, are positioned somewhat less than 22,240 miles above the Earth. As a result, several LEO satellites must be launched in order to provide nationwide coverage.

In order to utilized the LEO satellite 116, the receiving telephone 114 includes a satellite transmitter 118 and a satellite receiver 120 coupled to an antenna 122. Alternatively, the satellite transmitter and receiver can be coupled to the same antenna 60" that the cellular transmitter and receiver 56", 58" use. In either case, the satellite transmitter are capable of sending and receiving signals via the LEO satellite 116.

When a call request signal 15 arrives from a pull central office 12", the receiving telephone controller 46" can give a user of the receiving telephone a choice of response modes via the controller interface 54". If the receiving telephone 114 is within range of a cellular central office 61", the user can command the controller to transmit a call acceptance signal directly to the cellular central office. If out of range, the user can command the controller to transmit the call acceptance signal 17 to the cellular central office 61 via the satellite transmitter 118 and LEO satellite 116.

In addition to the satellite transmitter and receiver 118, 120, the receiving telephone 114 shown in FIG. 7 includes a card reader 124 coupled to the controller 46". The card reader is a conventional device that reads information from a small smart card (not shown) that is similar to an ordinary credit card or ATM card. Potential users of the receiving telephone can carry the smart card that has been coded, such as by a magnetic input or a bar code, to include an identification code. The card reader reads the identification code into the controller, which stores the code in the memory 52". After the identification code is stored in the memory, the receiving telephone will recognize a call request signal 15" that includes the identification code as its called party identification code. In addition, the fixed and mobile calling telephones 14A", 14B" can be equipped with such a card reader to read an identification code from another user's smart card and pass the identification code to the pull central office 12" as a calling party identification code. By incorporating such a card reader into the calling telephones or the receiving telephone, the pull communication system 10" allows numerous users to share a single phone. Further, an owner of a smart card can use any telephone with a card reader to send and receive telephone calls.

As is apparent from the foregoing discussion, by completing the original call from the calling party rather than requiring a separate call to be initiated by the called party, the present invention provides several advantages over the prior art. One advantage is the perception by the calling party that a "normal" telephone call has been made. This is in contrast to the delays and additional effort occurring in the requirement of the prior art that a new call be initiated from the called party to the calling party. Another advantage of the present system is that the calling party will not be busy with another call when the called party attempts to initiate a second call.

The pull communication system of the present invention provides an ability to broadcast a call request to a class of called parties. For example, if a user desires to call a mechanic and does not care which of a number of mechanics is available, in step 74 of FIG. 3 the user gives the pull central office controller 28 an identification of the mechanic class rather than an identification of a single individual being called. The receiving telephones for all users in the mechanic class include a mechanic class identification in addition to a unique user identification. The call request signal would then include the mechanic class identification and the pull central office would broadcast a call request to all cellular telephones having a mechanic class identification. Whichever mechanic is available and responds quickest with a call acceptance signal is connected to the calling party to complete the call. Such a class identification allows the calling party to connect with an available member of the class without having to separately call each member of the class.

Figure 8:
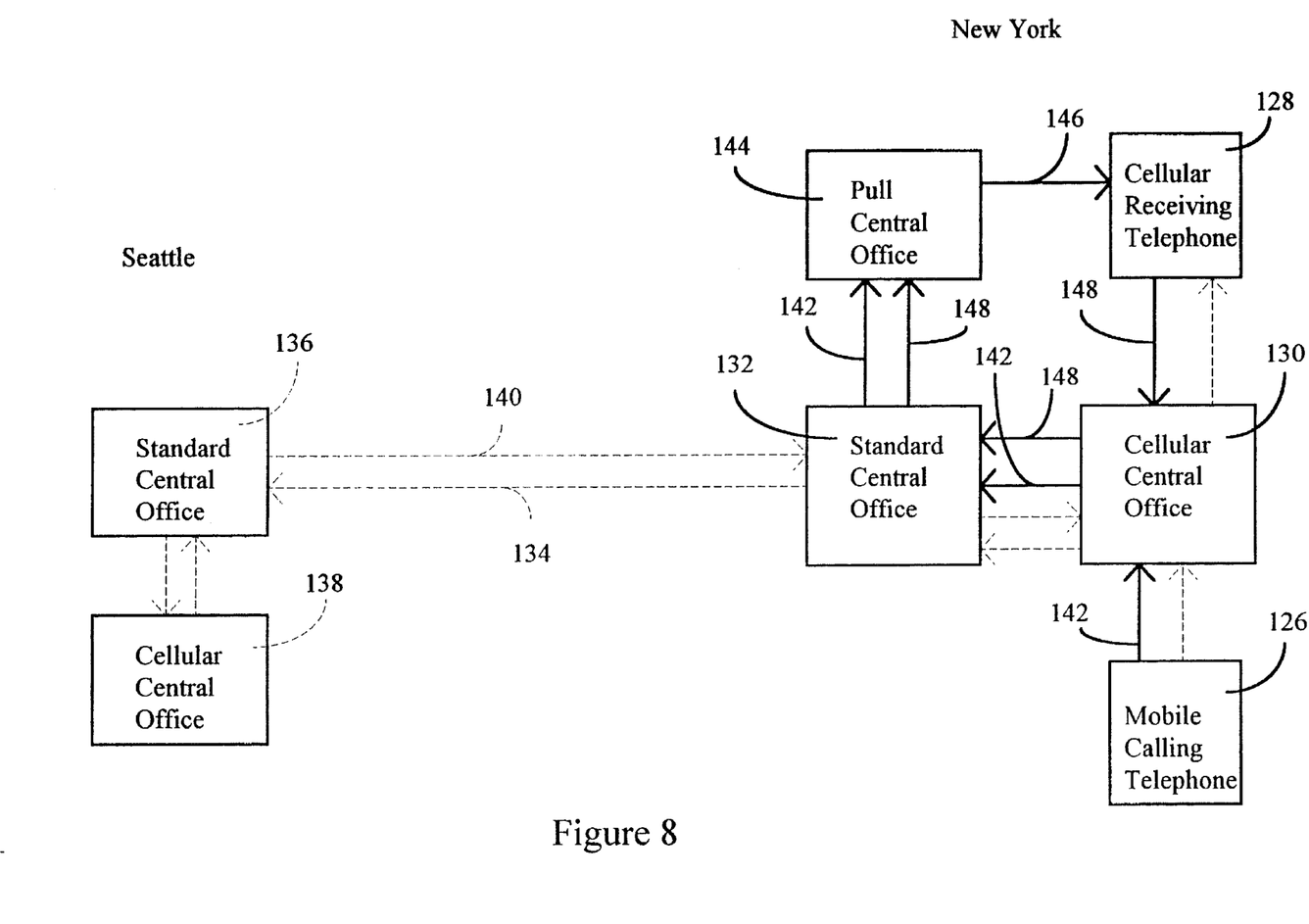
FIG. 8 is a block diagram comparing the operation of pull communications system of FIG. 1 with a prior art system.

Some of the advantages of the present invention over the prior art systems may best be appreciated with an example as shown in FIG. 8. FIG. 8 shows two cellular telephones 126 and 128 presently located in New York, each of whose normal local cellular area is centered in Seattle. FIG. 8 shows how a call from the calling telephone 126 to the receiving telephone 128 is completed using the prior art system discussed above that employs a database of the location of each user compared to a system according to the present invention. The signals passed using the prior art database system are depicted as dashed lines while the signals passed using a preferred embodiment of the present invention are depicted as solid lines.

Using the prior art database system, a calling signal is transmitted via a New York cellular central office 130, and a New York standard central office 132 and a long distance carrier line 134 to a standard central office 136 in Seattle. The Seattle standard central office sends the calling signal to a Seattle cellular central office 138 which uses its database to determine the location of the receiving telephone 128. The Seattle cellular central office 138 sends a connecting call back to New York via the Seattle standard central office 136 and a long distance carrier line 140 to complete the call. As a result, two long-distance telephone calls must be made and paid for in order to complete a local call in New York.

In contrast, the preferred embodiment of the present invention completes the call from the calling telephone 126 to the receiving telephone 128 without making any long distance calls. The calling telephone 126 sends a calling signal 142 to a pull central office 144 via the New York cellular central office 130 and the New York standard central office 132. The pull central office, operating according to mode 2 discussed above, obtains an identification of the receiving telephone 128. The pull central office broadcasts a call request signal 146 locally to the receiving telephone. The receiving telephone responds by sending a call acceptance signal 148 to the pull central office via the New York cellular and standard central offices. The pull central office connects the calling signal 142 with the call acceptance signal 148, thereby locally completing the call from the calling telephone to the receiving telephone.

Using the prior art page and call back system, the cellular calling telephone 126 pages the receiving telephone 128 via a local office (not shown) located in New York and gives the receiving telephone the telephone number of the calling telephone. The telephone number of the calling telephone is relative to the cell from which the page was made, so the calling telephone cannot leave the cell if the call back is to occur. Because of the high density of cellular telephone users in New York, each cell must be relatively small, so the calling telephone cannot move very far. If the user of the receiving telephone does not call back immediately, the user of the calling telephone becomes a prisoner in the cell while waiting for the call back. Further, the user of the calling telephone can make other calls only at the risk of missing the call back.

In contrast, using the pull communication system of the present invention, the calling telephone 126 calls the receiving telephone 128 locally in New York. If the user of the receiving telephone can accept the call, the connection is made locally. The calling telephone can move freely at all times because the calling telephone remains connected to the local pull central office 144 during the short time it takes to be connected to the receiving telephone party.

From the foregoing it will be appreciated that, although specific embodiments of the invention have been described herein for purposes of illustration, various modifications may be made without deviating from the spirit and scope of the invention. Accordingly, the invention is not limited to the embodiments described herein but is defined by the appended claims and legal equivalents thereof.

I claim:

1. A pull communication system for completing a call from a calling party to a called party, comprising:

a pull central office including:
   a switch that receives the call from the calling party, the switch including a plurality of switch ports, the switch associating the call with a first one of the switch ports;
   a transmitter;
   a switch controller in communication with the switch ports and the pull central office transmitter, the switch controller including:
      means for obtaining a called party identifier from the calling party;
      means for creating a call request signal that includes the called party identifier, switching information identifying a second switch port, and a message identification identifying the call from the calling party;
      means for causing the pull central office transmitter to transmit the call request signal to the called party; and
      means for connecting the second switch port of the switch to the first switch port using the message identification in response to a call acceptance signal that is received from the called party at the second switch port, thereby completing the call;

a first called party receiver that receives the call request signal from the pull central office;
a called party transmitter that transmits the call acceptance signal without requiring a separate telephone call, including the message identification, to the second switch port as identified by the switching information received in the call request signal, the message identification causing the pull central office connecting means to connect the called party to the calling party, thereby completing the call, and
a second called party receiver cooperating with the called party transmitter to allow two-way communication between the called party and the calling party after the pull central office completes the call.

2. The pull communication system of claim 1 wherein the pull central office further includes a receiver for receiving the call from the calling party and passing the call to the switch.

3. The pull communication system of claim 1 wherein:
the first called party receiver includes means for inputting a user identification code and a controller receiving the user identification code from the inputting means; storing the user identification code; and determining whether the stored user identification code matches the called party identifier in the call request, signal and
the called party transmitter sends the call acceptance signal if the stored user identification code matches the called party identifier.

4. The pull communication system of claim 3 wherein the first called party receiver inputting means includes a card reader that reads the user identification code from a user card and passes the user identification code to the controller for storage.

5. The pull communication system of claim 1 further including a standard central office connected to the pull central office switch by a trunk line, the standard central office receiving the call from the calling party and passing the call to the pull central office switch.

6. The pull communication system of claim 1 wherein the pull central office transmitter includes a global transmitter capable of transmitting the call request signal via a global network to the receiving telephone and a local transmitter capable of transmitting the call request signal locally to the receiving telephone.

7. The pull communication system of claim 6 wherein the switch controller includes means for receiving a call priority designation from the calling party, the call priority designation indicating whether the calling party signals the called party via the global transmitter, means for causing the pull central office transmitter to transmit the call request signal using the local transmitter when the designation is of a first priority, and means for causing the pull central office transmitter to transmit the call request signal using the global transmitter when the designation is of a second priority.

8. The pull communication system of claim 1 wherein the switch controller includes means for determining whether the calling party has remained connected to the first port before connecting the second port with the first port.

9. The pull communication system of claim 1 wherein:
the switch controller includes means for receiving from the calling party a class identifier that identifies a plurality of called parties, the receiving means passing the class identifier to the creating means for creating the call request signal and the creating means including the class identifier as the called party identifier in the call request signal; and
the first called party receiver includes:

means for inputting a user class identification code that identifies the called party as being a member of a class of users; and a controller that compares the class identifier received in the call request signal with the user class identification code to determine if the users in the class are being called.

10. A cellular telephone for use in a pull communication system that enables a call from a calling party to a called party to be completed, the call being directed to a pull central office, the pull central office creating a message identification that the pull central office uses to connect the called party to the calling party, thereby completing the call, the cellular telephone comprising:

a first receiver for receiving from the pull central office via a first signalling channel a call request signal that includes the message identification and a called party identifier identifying the called party;

means for inputting a user identification code;

a memory unit that stores the user identification code;

a transmitter that transmits a call acceptance signal to the pull central office without requiring a separate telephone call via a second signalling channel;

a pull controller that receives the call request signal, determines whether the stored user identification code matches the called party identifier received in the call request signal and if a match is determined, then the pull controller passes the switching information to the transmitter and enables the transmitter to transmit the call acceptance signal, including the message identification, to the pull central office, the message identification enabling the pull central office to connect the called party to the calling party; and a second receiver cooperating with the transmitter to allow two-way communication between the called party and the calling party after the pull central office completes the call;

11. The cellular telephone of claim 10 wherein the receiver includes a global receiver which receives the call request signal via a global network.

12. The cellular telephone of claim 10 wherein the receiver includes a local receiver which receives the call request signal locally from the pull central office.

13. The cellular telephone of claim 12, further including a satellite transmitter which transmits the call acceptance signal to the pull central office via a low earth orbiting satellite.

14. The cellular telephone of claim 10 wherein the receiver includes a local receiver which receives the call request signal locally from the pull central office and a global receiver which receives the call request signal via a global network.

15. The cellular telephone of claim 10, further including a controller interface in communication with the pull controller wherein the call request signal includes calling party identification information and the pull controller causes the controller interface to output the calling party identification information to a user.

16. The cellular telephone of claim 15 wherein the controller interface includes inputting means for enabling the user to input information to the pull controller in response to the calling party identification information, the pull controller determining whether to send the call acceptance signal based on the information input by the user in response to the calling party identification information.

17. The cellular telephone of claim 10, further including non-volatile memory that stores a class identifier that identifies a plurality of parties, wherein the call request signal includes a class identifier and the pull controller includes means for determining whether the call request class identifier matches the stored class identifier, and if there is a match then the pull controller enables the transmitter to transmit the call acceptance signal.

18. A pull communication system that enables a call from a calling party to a called party to be completed, the called party being one of plural system users comprising:

a central office including:

a switch that receives a calling signal from the calling party, the switch including a plurality of switch ports, the switch associating the calling signal with a first one of the switch ports;

a switch transmitter that transmits a call request paging signal to the called party;

a switch controller in communication with the switch and the switch transmitter, the switch controller including means for obtaining a called party identifier from the calling party, means for creating the call request signal that includes the called party identifiers means for causing the switch transmitter to transmit the call request signal to the called party, means for receiving a call acceptance signal from the called party at a second port of the switch, and means for connecting the second port to the first port, thereby completing the call;

a receiving device that receives the call request paging signal from the central office, the receiving device including:

means for inputting a user identification code;

a memory unit that stores the user identification code;

a processor that determines whether the stored user identification code matches the called party identifier; and a two-way communication device including:

a transmitter that transmits the call acceptance signal to the central office without requiring a separate telephone call if the stored user identification code matches the called party identifier, and;

a receiver cooperating with the transmitter to allow two-way communication between the called party and the calling party after the central office completes the call.

19. The pull communication system of claim 18 wherein the call acceptance signal is a radio signal, the system further including a cellular receiver connected to the switch, the cellular receiver receiving the call acceptance signal and passing the call acceptance signal to the switch.

20. The pull communication system of claim 18 wherein the switch transmitter includes a global transmitter that transmits the call request signal via a global network.

21. The pull communication system of claim 20 wherein the switch transmitter includes a local transmitter which transmits the call request signal locally to the called party.

22. The pull communication system of claim 18 further including a standard central office connected to the switch via a trunk line.

23. The pull communication system of claim 18 wherein the means for obtaining the called party identifier includes means for decoding the calling signal into the called party identifier.

24. The pull communication system of claim 18 wherein the means for obtaining the called party identifier includes means querying the calling party for the called party identifier.

25. The pull communication system of claim 18 wherein the switch transmitter includes a global transmitter which transmits the call request signal via a global network to the called party and a local transmitter which transmits the call request signal locally to the called party.

26. The pull communication system of claim 25 wherein the switch controller includes means for receiving a call priority designation from the calling party, the call priority designation indicating whether the calling party signals the called party via the global transmitter, means for causing the switch transmitter to transmit the call request signal using the local transmitter when the designation is of a first priority, and means for causing the switch transmitter to transmit the call request signal using the global transmitter when the designation is of a second priority.

27. The pull communication system of claim 14 wherein the switch controller includes means for determining whether the calling party has remained connected to the first port before connecting the second port with the first port.

28. The pull communication system of claim 18 wherein the controller includes means for receiving from the calling party a class identifier that identifies a plurality of called parties, the receiving means integrating the class identifier into the call request signal and the transmitter transmitting the call request signal to each of the called parties.

29. A pull communication method of completing a call from a calling party to a called party having a first paging receiver and access to a plurality of telephones, comprising:

receiving a calling signal from the calling party at a first switch port of a pull central office which has a plurality of switch ports;

transmitting a call request signal via a first signalling channel to the called party paging receiver in response to receipt of the calling signal at the pull central office, the call request signal including a switching identification identifying a second switch port, and a message identification that identifies the calling party at the first switch port;

receiving the call request signal at the called party first paging receiver;

selecting one of the telephones for responding to the call request signal;

transmitting a call acceptance signal from the selected telephone via a second signalling channel to the second port of the pull central office using the switching information received in the call request signal, the call acceptance signal including the message identification received in the call request signal;

receiving the call acceptance signal at the second port of the pull central office; and connecting the second port to the first port to complete the call using the message identification received in the call acceptance signal.

30. The pull communication method of claim 29 wherein the transmitting a call request signal step includes transmitting the call request signal via a global network.

31. The pull communication method of claim 29, further including:

receiving from the calling party a designation of call priority, wherein when the designation is of a first priority, the transmitting step includes transmitting the call request signal locally and when the designation is of a second priority, the transmitting step includes transmitting the call request signal via a global network.

32. The pull communication method of claim 29, further including determining whether the calling party has remained connected to the first port before connecting the second port to the first port.

33. The pull communication method of claim 29, further including receiving from the calling party a class identifier that identifies a plurality of called parties, integrating the class identifier into the call request signal.

34. The pull communication method of claim 29, further including decoding the calling signal into a called party identifier and incorporating the called party identifier in the call request signal.

35. The pull communication method of claim 29, further including querying the calling party for a called party identifier and incorporating the called party identifier in the call request signal.

36. The pull communication method of claim 29 the step of transmitting a call acceptance signal includes transmitting the call acceptance signal via a low earth orbiting satellite.

37. The pull communication method of claim 29, further including:

incorporating a called party identifier in the call request signal;

inputting a first user identification code into a first controller memory associated with the called party first paging receiver; and determining whether the first user identification code matches the called party identifier in the call request signal and sending the call acceptance signal if a match is found.

38. The pull communication method of claim 37, wherein the inputting step includes reading the user identification code from a smart card.

39. The pull communication method of claim 37, further including:

inputting a second user identification code into the first controller memory associated with the called party first paging receiver; and determining whether the stored second user identification matches the called party identifier in the call request signal and sending the call acceptance signal if a match is found.

40. The pull communication method of claim 37, further including:

inputting the first user identification code into a second controller memory associated with a called party second paging receiver; and determining whether the first user identification code input into the second controller memory matches the called party identifier in the call request signal and sending the call acceptance signal if a match is found.

* * * * *

UNITED STATES PATENT AND TRADEMARK OFFICE
CERTIFICATE OF CORRECTION

PATENT NO. : 5,479,478
DATED : December 26, 1995
INVENTOR(S) : August F. Fath

It is certified that error appears in the above-indentified patent and that said Letters Patent is hereby corrected as shown below:

In column 14, claim 18, line 21, following "fiers", please insert --,--.

In column 14, claim 18, line 21, please delete "fiers" and insert therefor --fier--.

Signed and Sealed this

Fourth Day of June, 1996

Attest:

BRUCE LEHMAN

*Attesting Officer*     *Commissioner of Patents and Trademarks*